United States Patent
Gay

(10) Patent No.: US 9,622,490 B2
(45) Date of Patent: Apr. 18, 2017

(54) APPARATUS AND PROCEDURE FOR THE MOLDING AND COOKING OF STUFFED FOOD PRODUCTS

(71) Applicant: Nestor Raul Gay, Provincia de Cordoba (AR)

(72) Inventor: Nestor Raul Gay, Provincia de Cordoba (AR)

(73) Assignee: PAGNINI, Comba Hermanos y Compania S.R.L., Provincia de Cordoba (AR)

( * ) Notice: Subject to any disclaimer, the term of this patent is extended or adjusted under 35 U.S.C. 154(b) by 233 days.

(21) Appl. No.: 14/321,899

(22) Filed: Jul. 2, 2014

(65) Prior Publication Data
US 2015/0010684 A1  Jan. 8, 2015

(30) Foreign Application Priority Data
Jul. 4, 2013 (AR) .............................. P130102382

(51) Int. Cl.
| | | |
|---|---|---|
| A23C 7/00 | (2006.01) | |
| A23L 1/31 | (2006.01) | |
| A22C 7/00 | (2006.01) | |
| A23L 13/00 | (2016.01) | |

(52) U.S. Cl.
CPC ............ *A22C 7/003* (2013.01); *A22C 7/0046* (2013.01); *A22C 7/0061* (2013.01); *A23L 13/03* (2016.08)

(58) Field of Classification Search
CPC ..... A22C 7/003; A22C 7/0046; A22C 7/0061; A23L 1/3103

USPC ............................ 99/441, 349, 351; 426/521
See application file for complete search history.

(56) References Cited

U.S. PATENT DOCUMENTS

| | | | | |
|---|---|---|---|---|
| 1,986,115 A | * | 1/1935 | Offenhauser | A22C 7/0061 99/349 |
| 2,310,956 A | * | 2/1943 | Hoy | A22C 7/0046 99/351 |
| 2,979,775 A | * | 4/1961 | White | B29C 44/10 264/275 |
| 3,580,165 A | * | 5/1971 | Foldenauer | A47J 27/20 100/219 |
| 3,604,339 A | * | 9/1971 | Beck | A22C 7/0046 100/116 |
| 3,646,881 A | * | 3/1972 | Rathjen | A22C 7/003 100/219 |
| 3,750,563 A | * | 8/1973 | Tonjum | A22C 7/0061 100/194 |
| RE28,106 E | * | 8/1974 | Lee | A22C 7/0053 100/910 |

(Continued)

*Primary Examiner* — Alison L Hindenlang
*Assistant Examiner* — Emmanuel S Luk
(74) *Attorney, Agent, or Firm* — Defillo & Associates, Inc.; Evelyn A Defillo

(57) ABSTRACT

A molding and cooking apparatus for pieces of stuffed product such as cooked hams, which includes one or more molding cavities long enough so that more than one piece of stuffed product can be introduced in the same molding cavity, inserting separators which help to shape the ends of the pieces of vacuum stuffed product, both ends of the cavities are open and are sealed during product cooking, which permits a quick discharge of the already cooked and cooled pieces when the cavities bottoms are unsealed, and permits the product to fall because of gravity onto a collecting tray, likewise a procedure is revealed on the efficient use of this apparatus herein disclosed.

7 Claims, 5 Drawing Sheets

(56) References Cited

U.S. PATENT DOCUMENTS

| | | | | |
|---|---|---|---|---|
| 3,943,602 | A * | 3/1976 | Siclari | A22C 7/0076 |
| | | | | 425/338 |
| 4,891,237 | A * | 1/1990 | Rabotski | A22C 7/0046 |
| | | | | 249/121 |
| 5,499,575 | A * | 3/1996 | Handel | A22C 7/0053 |
| | | | | 249/121 |
| 5,658,608 | A * | 8/1997 | Klefbeck | A22C 7/0046 |
| | | | | 100/289 |
| 5,921,171 | A * | 7/1999 | Dreano | A22C 7/0046 |
| | | | | 100/194 |
| 6,761,108 | B1 * | 7/2004 | Dreano | A22C 7/0046 |
| | | | | 99/349 |
| 7,069,840 | B1 * | 7/2006 | Howard | A22C 7/0053 |
| | | | | 100/194 |
| 2011/0011852 | A1 * | 1/2011 | Mezquida Gisbert | A23G 9/221 |
| | | | | 219/672 |
| 2012/0064185 | A1 * | 3/2012 | Fava | A22C 7/0053 |
| | | | | 425/161 |
| 2013/0125767 | A1 * | 5/2013 | Shoshan | A47J 43/20 |
| | | | | 99/441 |

\* cited by examiner

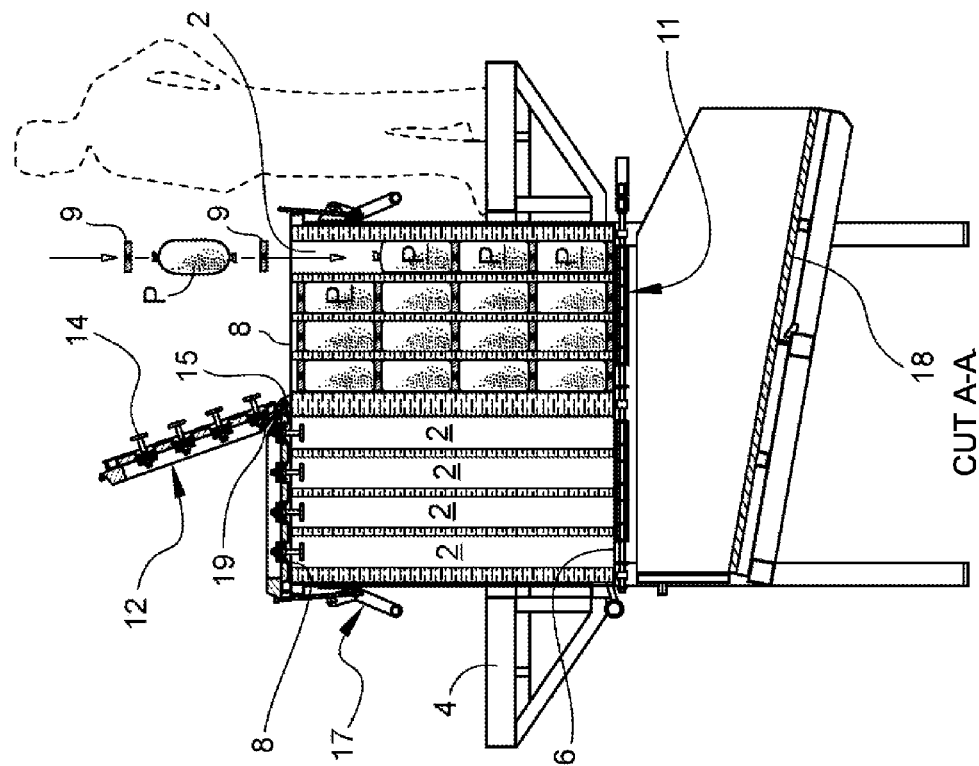
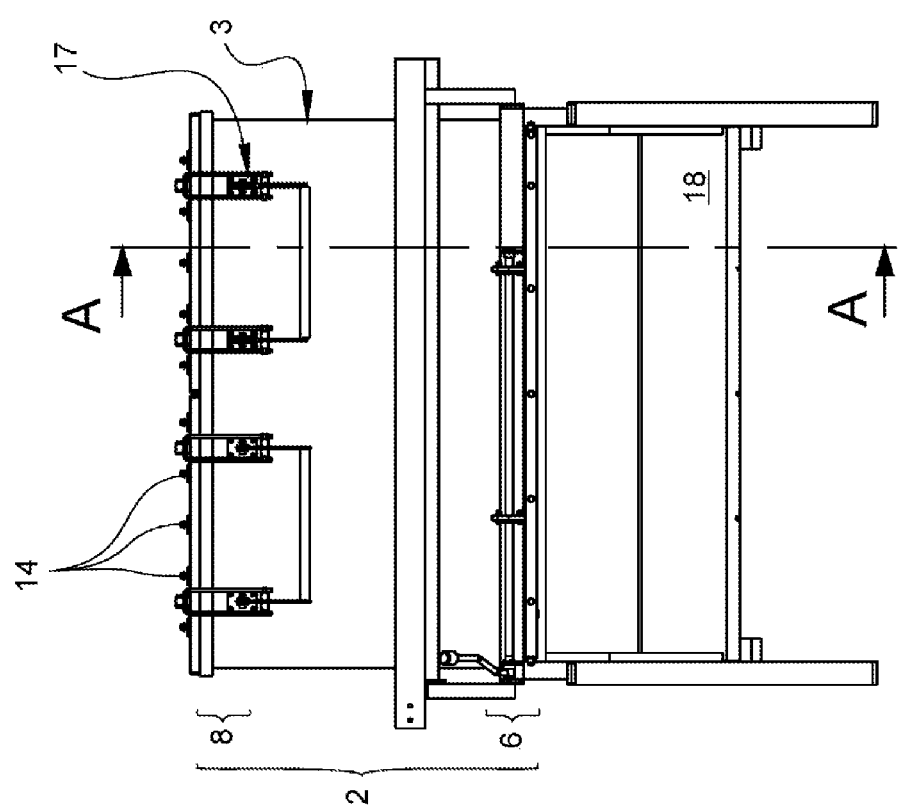

APPARATUS AND PROCEDURE FOR THE MOLDING AND COOKING OF STUFFED FOOD PRODUCTS

STATE OF THE ART OF THE INVENTION

Field of the Invention

This invention is within the field of the technique referred to apparatus, machinery or installations intended to manufacture precooked food products; more specifically this invention refers to a new apparatus intended for the molding and cooking of stuffed food products, ok the kind wherein the final product is obtained through molding and cooking of meat cuts inside recipients which are bain-marie heated or with steam jackets, among others.

Description of the State of the Art

To better understand the purpose and scope of this invention it is convenient to describe the present state of the technique so that the proposed advantages of this invention can be identified.

At present, food products industry produces and offers to the market a variety of precooked stuffed or filled products such as cooked hams, salchichón (kind of pork sausage) and bologna, among others. Such products of particular interest to the purpose of this invention, are generally obtained base on a spiced meat paste which is stuffed inside a coating such as natural or artificial intestine casings or some kind of packing or cover generally tubular. The stuffing of the several kinds of pastes, generally raw, is intended to confine pieces of a specific size, for example, forming a prismatic piece more or less elongated when both ends are closed, creating a closed section, that is to say, two of the ends of each stuffed piece are closed by means of some tie, or closing terminals, preferably metal clips.

After the stuffing of paste or food product and the subsequent forming of the individual pieces closed in both ends, the same are subject to cooking taking care that each stuffed piece is confined inside a mold with the ability to compress and make the piece adopt the desired final shape.

Generally, the market needs that final shape of the piece obtained is appropriate to the kind of use further desired. AS an example, when the piece is to be sold in slices, it needs to have an even cross section in almost all the length of the piece to obtain all the slices with a similar size. Accordingly, for the complete use of the product and to keep the ideal shape of the product, it is preferable to provide a rectangular prismatic or cylindrical shape or any other convenient shape with end sides generally plain and even section, and to achieve this the stuffed pieces are confined inside molds to copy the desired final shape.

Molds being used at present are made of stainless steel containers with an opening where the stuffed piece is entered and then closed using some kind of cover that can exert some force to compress the product. The compression force over the product that is being cooked by dipping is applied to compensate any kind of change in the shape, generally because of reduction in the product volume. Once inside the molds, the stuffed pieces are cooked until the inside of the piece reaches the pre-established temperature and time of cooking, to be then cooled and unmolded as soon as possible.

Cooking techniques by mold dipping can be varied, generally the stuffed pieces are taken from each mold after the opening of the cover where they were initially introduced, which requires time and increases production costs.

Therefore, and taking into account that the food product manufacturing industry demands day-to-day faster and more efficient processes, the inventors herein have developed a new apparatus for industrial use that can mold and cook stuffed products as those above mentioned in a more efficient manner.

The construction features of the apparatus object of this invention make it possible to obtain a great amount of production with fast product loading and unloading. At the same time, it is disclosed a novel and efficient manufacturing process to be used with this machine, all of this in agreement with the detailed description, figures and attached claims of the present invention.

BRIEF DESCRIPTION OF THE INVENTION

The purpose of this invention is to provide a molding and cooking apparatus for filled pieces like cooked hams among others; in such a manner that the apparatus could include one or more molding cavities wherein the cooking of said pieces is performed by means of fluid heat exchange; the kind of appropriate fluid to be used can be vapor, so that it circulates outside said molding cavities, in ducts or through the space between said molding cavities in such a manner so as to cook the filled piece safely and efficiently.

Another scope of this invention is to provide a molding and cooking apparatus wherein the stuffed pieces are packed inside a coating in the manner of hermetic sealing and more preferably vacuum packed and closed in both ends with closing terminals of the metal clip type, some kind of tying or similar, shaping individual pieces of a defined length ready to be cooked and molded.

Another scope of this invention is to provide said molding cavities with a convenient shape, so that they result tubular and present a first open end generally positioned downwards, which is sealed through a locking medium of discharge, and a second open end generally upwards which is locked with a locking cover, and therefore enables a comfortable load of the pieces inside the cavities.

Another scope of the apparatus purpose of this invention is to provide molding cavities to be used jointly with spacer items which are put in between the stuffed pieces stacked up inside the molding cavity. To this purpose each molding cavity is long enough so as to provide space for the stacking up of a plurality of filled pieces to be molded and cooked.

Another scope of this invention is to provide a molding and cooking apparatus for stuffed pieces which provides an easy loading of the pieces inside the molding cavities, so that the tubular molding cavities are presented vertically and therefore a fast loading and unloading can be performed, incorporating discharge tray so that the unsealing of one of the open ends of the cavities let the filled pieces to be received in said tray in a simple manner.

Another of the scopes of this invention is that the pieces filled with product should achieve the desired shape, preferably a parallelepiped and/or an oblong piece with a constant section, that when confined inside the molding cavities in a cramped manner, in relation to this, the shape of the cavities and the spacer pieces as a means of separations, intermediaries or terminals contribute as a whole to obtain the desired shape in all the pieces of each pile of product formed.

Another scope of this invention is to provide a procedure for the production of the molding and cooking of the pieces filled with products to be carried out in the apparatus herein proposed, taken to the practice through following steps: a) To seal one of the extremes of the cavities of the tubular mold; b) to enter a plurality of pieces filled with product not cooked yet inside said tubular molding chambers inserting a separation item; c) to close the other end of said tubular molding remaining said pieces on stuffed product confined between said cavity of tubular molding, said discharge gate and said locking cover; d) to circulate a heating factor in the outside of said tubular molding cavities for the required period of time until the desired cooking degree is obtained; e) to circulate a cooling fluid in the outside of said tubular molding cavities for the period of time required until the desired cooling degree is achieved so that it can be correctly unmolded; f) unseal the end located in the lower portion of said tubular molding cavity, which permits the fall of pieces of stuffed product that were confined during cooking and cooling; Besides the apparatus is also appropriate to: (g) to collect the pieces of stuffed product that fall from said bottom end of said molding cavities, in a collecting tray; where in step a) the sealing of said end includes the sealing of the lower end by means of said discharge sealing device; and in step c) the sealing of the other end of the tubular molding cavity comprises the sealing of the upper end by means of a locking cover.

Other additional scopes of the embodiments of this invention shall be evident in the section corresponding to detailed description of the invention and in the annexed claims.

BRIEF DESCRIPTION OF THE DRAWINGS

For better and clear understanding of the purpose of this invention, the same has been illustrated in several figures, wherein the invention has been represented in a preferred embodiment, all of this as a manner of example, where:

FIG. 2 is a front view of the molding and cooking apparatus for stuffed food products according to the preferred first embodiment.

FIG. 3 shows a cross section view according to plane A-A, indicated in the previous figure, which illustrates the inner side of the molding cavities, with the stuffed pieces already loaded inside some of the molding cavities, and the upper locking cover still open.

DETAILED DESCRIPTION OF THE INVENTION

Figure 1:
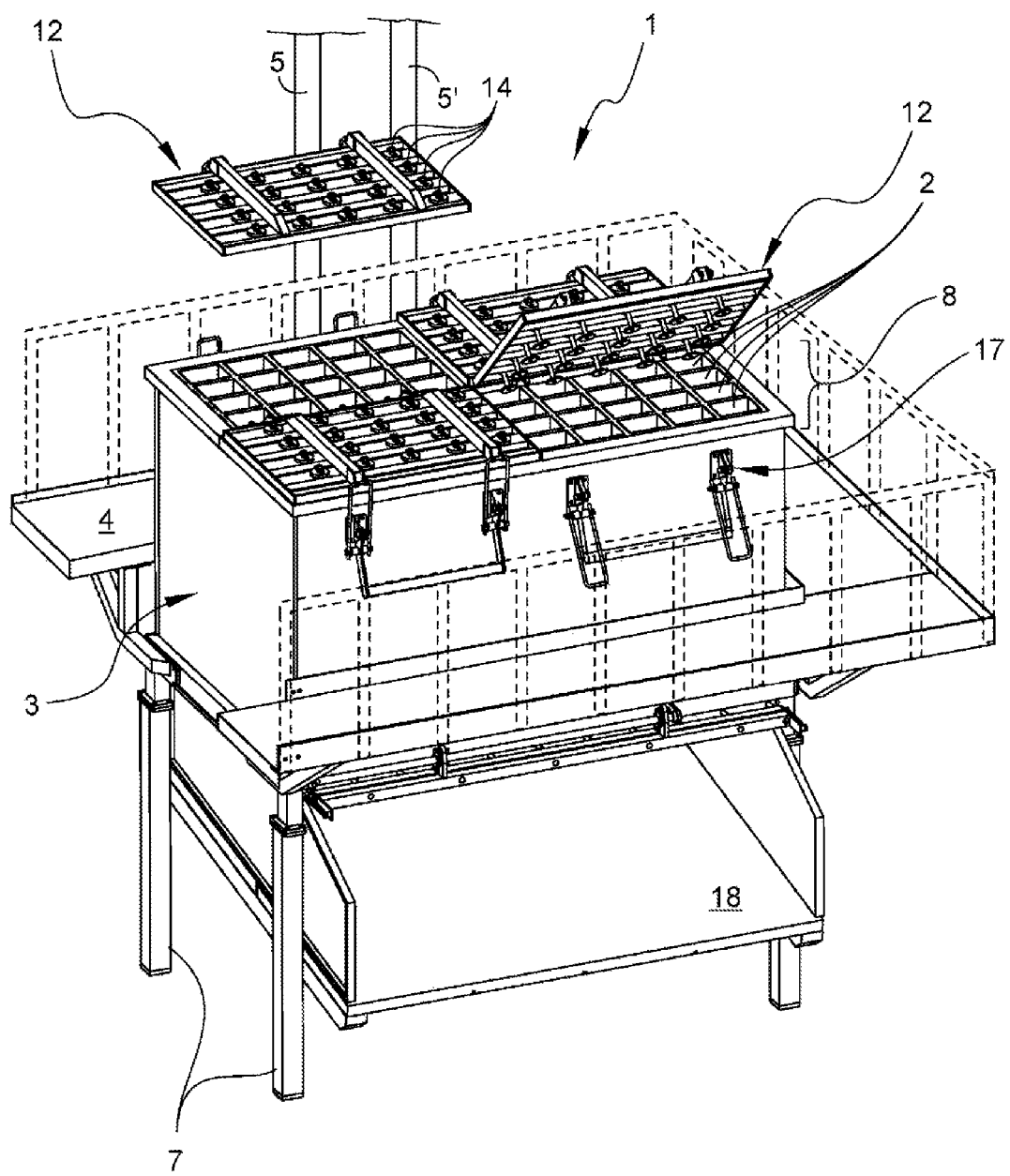
FIG. 1 is a general perspective top view and from the front view of a first embodiment of a molding and cooking apparatus for cold meat products according to this invention, wherein the general aspect of said apparatus (1) cab be observed in its basic configuration, one set of molding cavities is open for illustrative purposes, and one of the covers is completely taken out for descriptive purposes.

The description that follows is a preferred embodiment to put into practice the new apparatus proposed by this invention herein, said description is complemented with the drawings above mentioned, wherein the same reference numerals in the several drawings correspond to equivalent components.

Starting with the description of a preferred embodiment of the present invention and according to the drawings attached herein, it is made clear that the present invention refers to a new apparatus (1) of the type intended to be normally installed in a food product manufacturing industry. The kind of food product which this apparatus is mainly intended to is food products which are vacuum stuffed products inside a coating which need further molding and cooking.

As those skilled in the art would appreciate, the apparatus (1) herein described has a supporting structure in order to be accordingly installed, which may be mainly formed with strong metal supporting legs (7) and a rack or complementary supporting structure more or less complex which holds the assembly of molding cavities (3).

FIG. 1, shows an assembly of molding cavities (3) which could be part of facilities of a bigger size (for example, the apparatus could be enlarged to the left of the illustrated drawing). The apparatus corresponding to this invention can be built in modules to be adapted to several production volumes, from a single one molding cavity (not recommended for industrial use) to dozens or hundreds of cavities operating in parallel.

As those skilled in the art would understand, the apparatus is complemented with some accessory fittings and connections which are common practice to many other industrial facilities. Said accessory connections and fittings make the apparatus (1) functioning possible, for example, they can provide power supply, steam and other fluids used during the process, but they are not part of the scope of the invention herein proposed and for that reason these will only be mentioned for illustrative purposes, which mention and reference shall be enough for those skilled in the art for their understanding.

Since the preferred cooking embodiment of this invention is by means of steam, steam pipes (5, 5') are provided connected to the cavities assembly (3) so that steam circulates on the outer part of the individual cavities (2) and exchanges heat with the product inside said molding cavities (2) therefore cooking the product. Said steam pipes (5, 5') can also be used to circulate any other type of fluid, as for example a fluid as water, to achieve a cooling effect, etc. A footbridge (4) complemented with a handrail (illustrated in discontinuous traces in order to clarify the rest of the figure) permits an operator or supervisor to access safely the upper part of the apparatus where the product is introduced to be molded and cooked.

The arrangement, quantity and shape of auxiliary connections and fittings may vary according to simple selection of design adopted by those skilled in the art without major limitations.

As it is illustrated in FIG. 1 and for practical purposes, the molding and cooking apparatus (1) for stuffed products, has more than one single molding cavity (2) to optimize the performance of the apparatus. For said reason, cavities (2) are grouped in an assembly of molding cavities (3), wherein the expression "an assembly of molding cavities" for the purposes of this invention, refers to an arrangement, setting or plurality of individual molding cavities (2) generally elongated, vertical and parallel to each other, with a reasonable tolerance as regards size, shape and gradient of the same so as to consider equivalent embodiments. Likewise, whether a single molding cavity (2) or an assembly of molding cavities (3) is described, in both instances the qualities described are equivalent.

Figure 4:
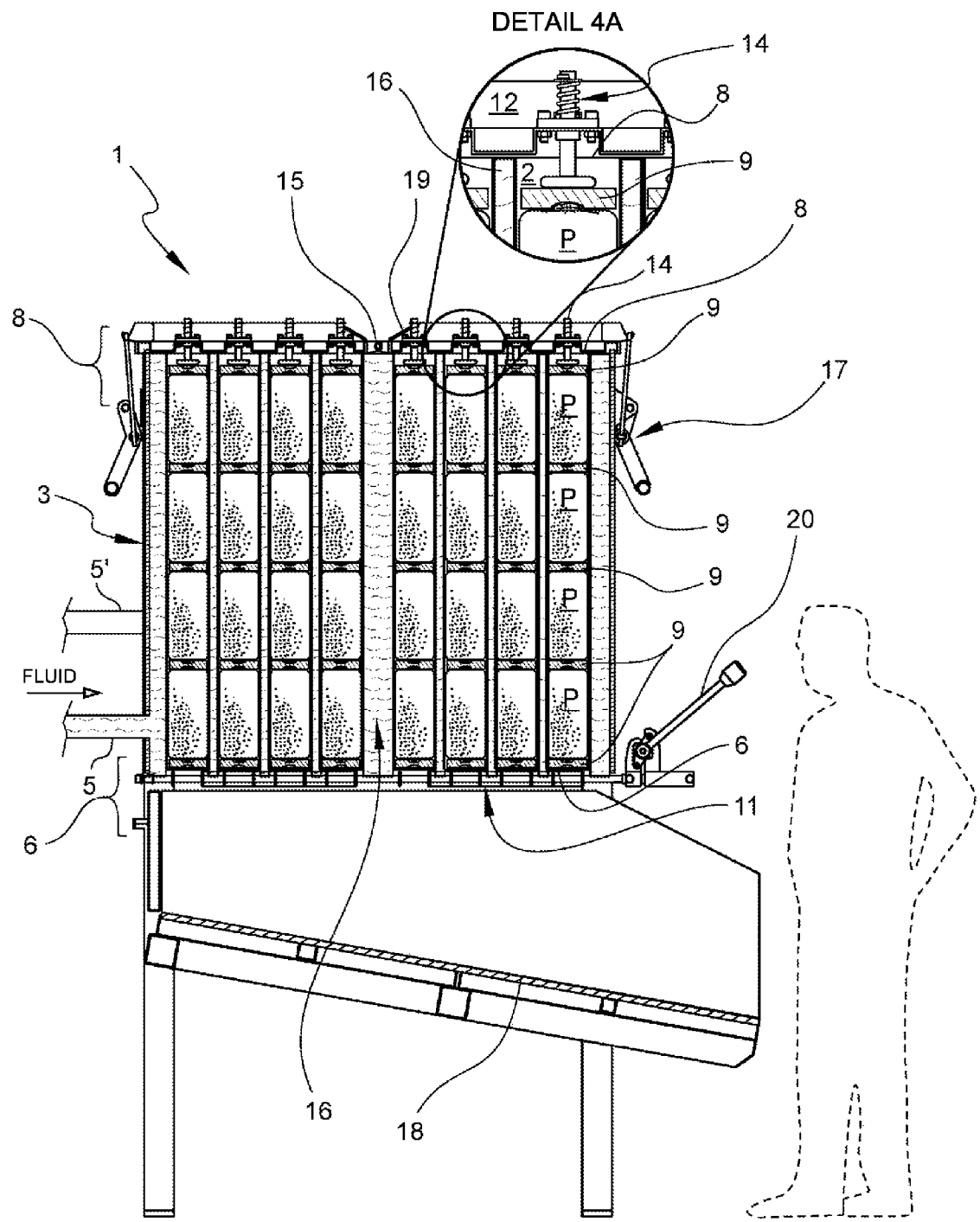
FIG. 4 is a cross sectional view according to plane A-A indicated in FIG. 2, which illustrates the molding cavities stuffed with the product, during the cooking stage, said figure includes a magnified detail indicated as Detail 4A, which illustrates the upper end of the molding cavities.
Figure 5:
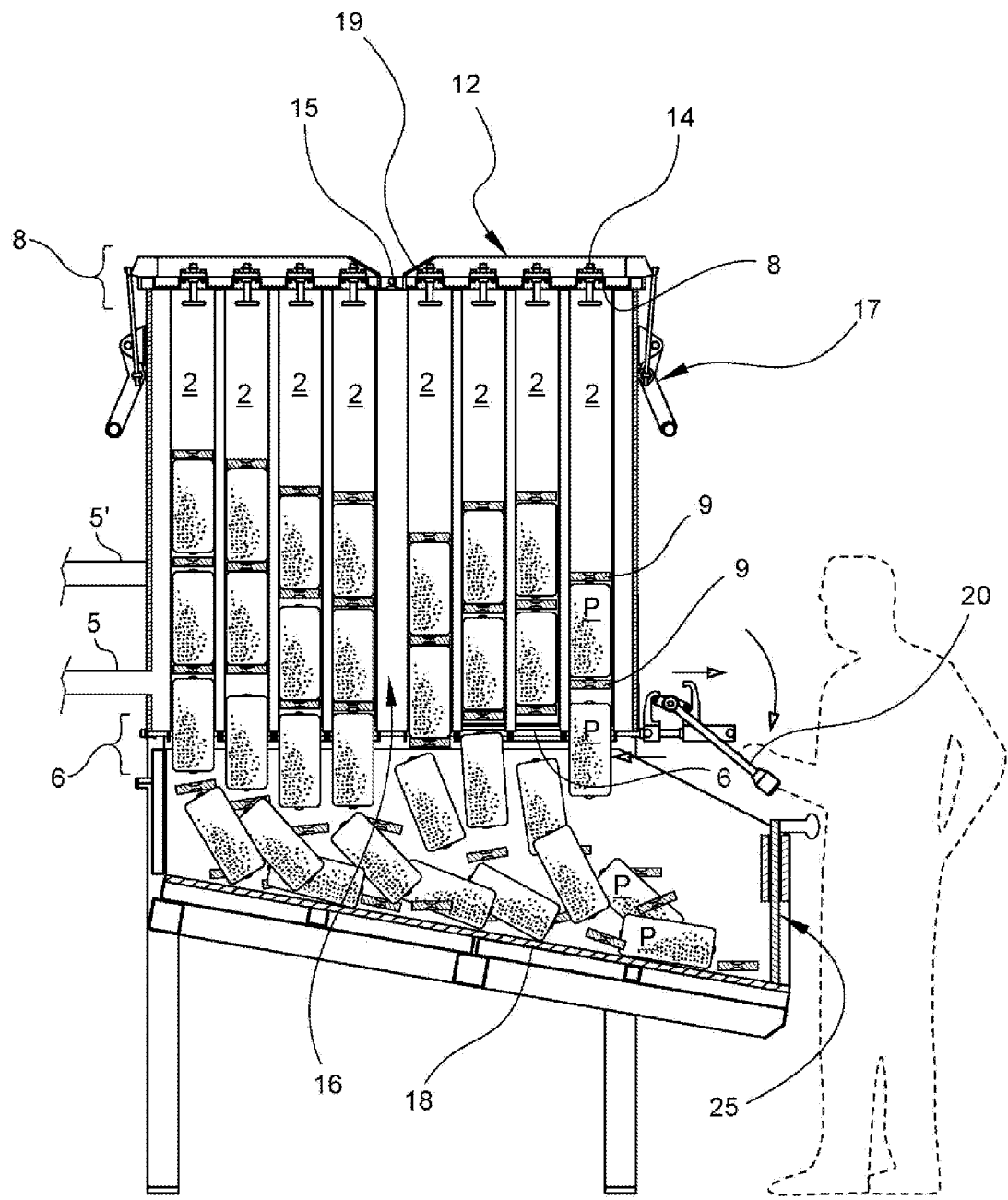
FIG. 5 is a cross section view according to said plane indicated in FIG. 2, which illustrates the moment when the cavities are unsealed in the lower part to let the stuffed products already cooked fall.

More specifically and as it is better shown in FIGS. 3 to 5, the molding cavities (2) are tubular and have a first open end (6), preferably in the lower section, which is sealed through a discharge sealing means (11); and a second open end (8), preferably in the upper section, which is sealed with a locking cover (12). The assembly of open ends (8) of the tubular molding cavities (2) is shown between square brackets in said FIG. 1, and it is the opening through which the stuffed product (P) is introduced to be molded and cooked.

One of the noticeable advantages of the tubular molding cavities (2) in the apparatus of this invention is that the cavities length is enough to stack a plurality of stuffed pieces (P), and therefore it is possible to achieve a stage of initial load of multiple stuffed pieces (P) inside each individual molding cavity (2) (See FIG. 4). Likewise, as a preferred embodiment, molding cavities (2) as it is shown in FIGS. 3 to 5, are oriented vertically, so that the stuffed pieces can enter easily from a second open end (8), that is to say, from the upper end, stacking more than one stuffed piece (P) inside the molding cavity, improving the use of each molding cavity (2) and the performance of the group.

As it can be observed in said FIGS. 3 to 5, there are some separators (9) in between each pieces of stuffed product (P), in such a manner that the closed end of each stuffed piece (P) does not get into direct contact with the close end of the following stuffed piece in the stack, but through said separator mean (9) which really gets in contact with each end of stuffed product (P) so as to protect and shape each end in a desired shape, which in a preferred embodiment, is plane.

Although it could be considered that the stuffed pieces (P) could be stacked one after the other, disregarding the separator means (9), there is a disadvantage evident at the moment of loading of the stuffed pieces (P) stacks and during the product cooking. This inconvenient is due to the fact that it is not possible to guarantee that direct contact between adjacent pieces (P) is clear and plain and for said reason pieces already cooked may show ends which are out-of-shape, bulking and/or even damaged between themselves by the clips used as closing terminals. For said reason, the inclusion of some separator means (9) has proved to solve this inconvenient amazingly.

To guarantee the desire shape of the ends in the stuffed pieces (P), the same are introduced inside each molding cavity (2) from the upper part (8), inserting at least one separator item (9) in between piece and piece (P). Likewise, two terminal separator items (9) are placed to start and finish the stacking of stuffed products (2), that is to say, in a preferred embodiment in the upper and lower ends of the stack of stuffed products (P), by way of packing of the stacked assembly.

The second open end (8) of each molding cavity (8) is generally located in the upper section; and therefore it can be referred to as the upper end (8) although it is not always necessary that it be located in the upper section of the apparatus (1). Such locking cover (12) includes a thrust means (14) preferably spring driven, which exerts a force over the plurality of the pieces of stuffed product (P) stacked inside the molding cavities (2) in the direction of the first sealable open end (6) through the sealable means of discharge (11), this guarantees that the pieces (P) copy the inner shape of the molding cavities (2).

In this manner, a first terminal separator means (9) is inserted and held at the bottom of the molding cavity (2) acting as a terminal separator item; splitting the interior from the exterior of the molding cavity (2).

Such separator (9) located in the bottom end of the molding cavity (2), applied in said manner, works as a sealing of the lower end (6). The manner to keep said separator element (9) so that it does not fall or gets out from the cavity is to interfere the release by means of a rod, strap or bar with sliding command in at least two positions; one sealing position (See FIG. 6a) and an unsealing position (See FIG. 6b) of the first ends (6) in the lower part of the molding cavities (2).

Figures 6A, 6B:
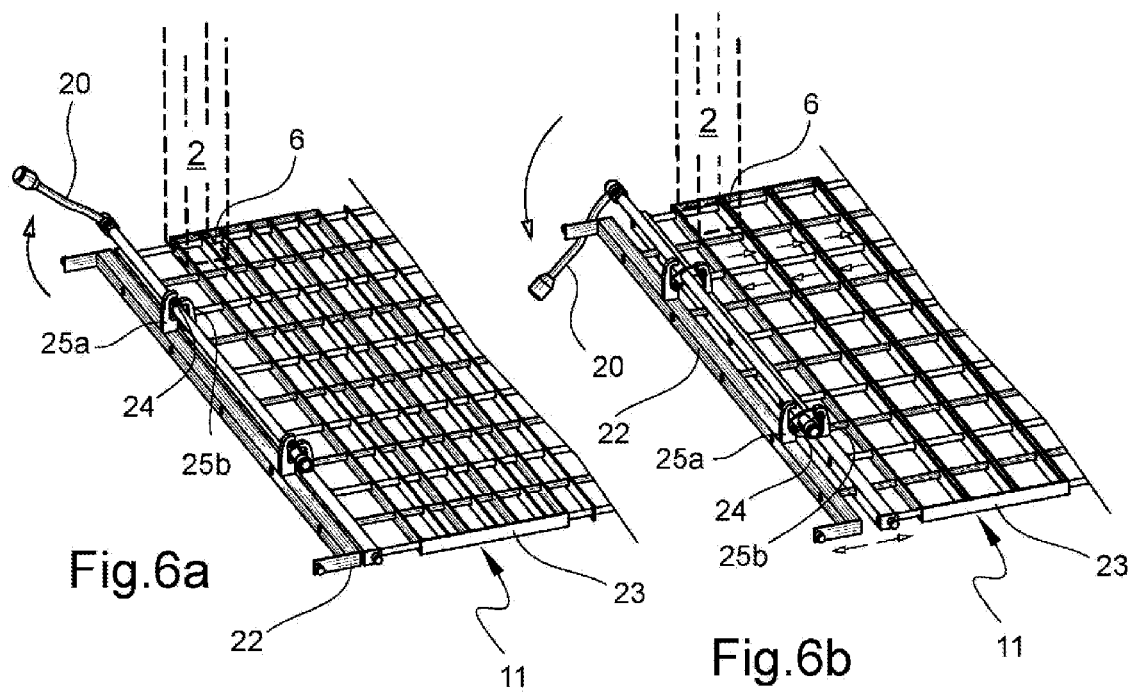
FIGS. 6a and 6b illustrate a partial detail of a preferred embodiment of the sealing and unsealing mechanism of the lower part of the molding cavities.

One preferred manner for the sealing of discharge (11) can be carried out with a grid as shown in FIGS. 6a and 6b, in said figures a partial detail of the area of the lower section of the cavities is shown, which also illustrates in discontinuous lines one of the molding cavity (2). In both figures an operating lever (20) makes it possible to separate or join a first half of the grid (22) with respect to a second half of the grid (23), formed by sliding rods and transverse straps, in said FIG. 6a, the transverse straps, in rectangular section, interfere the discharge hole (6) of the molding cavity (2), sealing the first end (6) of cavity (2). The operating lever (20) is elevated and produces the two follower stops (25a and 25b) to be stacked up against a rotary cam (24) in such a manner that the transverse straps interfere with the discharge section at the bottom of the molding cavities (2).

In FIG. 6b, the operating lever (20) is driven so that it rotates descending, and the rotary cam (24) produces the separation of the follower stops (25a and 25b) pulling back the first and second halves of the grid (22, 23) between them up to a separation space so that the discharge hole of the lower end (6) of the molding cavities (2) remain completely free to enable discharge through them.

This method to seal the bottom of molding cavities (2) has shown to be an effective and safe solution, although there could be other sealing methods to be put into practice by those skilled in the art, as for example, by means of gates directly hinged in the ends of the cavities or laterally displacing gates, as other equivalent embodiments for the same operation.

Figure 7:
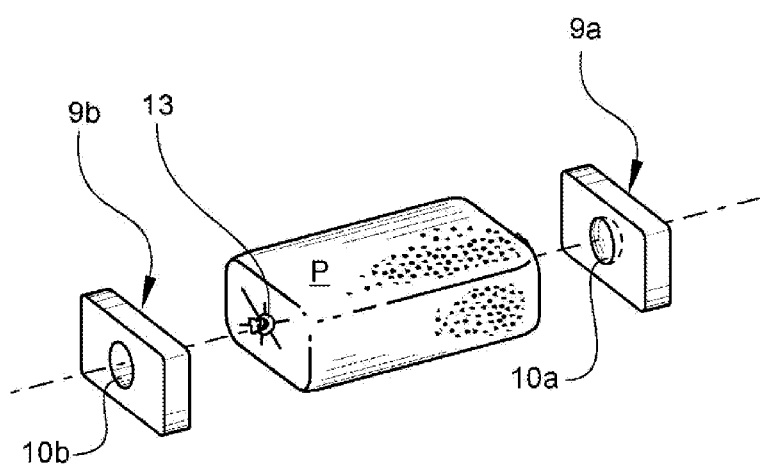
FIG. 7 is a perspective view of one of the stuffed pieces already cooked and unmolded, which also shows two preferred embodiments of the separator components used during the molding and cooking of said piece.

As it is shown in said FIG. 3, cavities (2) once sealed in the lower part (6), can be loaded with the stacks of stuffed products (P), and then the separator elements (9) can be inserted. Some preferred embodiments to put into practice said separator elements (9) can be seen in FIG. 7, identified for illustrative purposes as pieces (9a) and (9b). Both separator elements (9a, 9b) are intended to level ends of stuffed pieces in order to form a prismatic piece (P) that can be conveniently cut in even slices in the whole cut length of the piece. Piece (9a) particularly fits to operate as terminal separator element; it has a peripheral outline that matches with the cross section of said tubular molding cavities (2), which in this case is a rectangular section and can seal the cross section of the tubular molding cavity that for that purpose also has a profile generally rectangular. Such terminal separator piece (9a) includes a housing (10a) with space enough to hold or "hide" the closing terminal (13) of the coatings of such pieces of stuffed product (P). The housing (10a) enables a closing terminal (13) to hide inside the housing and therefore this permits that even the last slices obtained from the stuffed piece be complete, since otherwise the closing terminal (13), which is generally a metal clip, gets embedded against the extreme of the stuffed piece producing a concavity in the product. Likewise, a separator piece (9b) with similar geometry than the remaining separator pieces can add a housing (10b) implemented as a through hole performed in said separator element (9b).

It is clear for those skilled in the art, that said separator elements (9), can be designed as a series of additional improvements like rounding, bevels and surface finishing that enable a better insertion, handling, displacement and exit of the molding cavities (2). Additionally, pieces (9) can have embossments, identifiers and other accessories to complement their function or identification and can be built in several kinds of materials.

Regarding the material used for said separators, it is recommended to use material with a high heating transmission coefficient, so as not to interfere with cooking and cooling of the stuffed pieces (P), therefore the preferred ones are metal, more preferable stainless metal with good heating transmission coefficient.

Stages for the Loading, Molding and Cooking of the Product

In reference to FIG. 4, it is possible to see the stages or steps of process wherein all the stuffed pieces (P) are loaded and kept inside the molding cavities (2), only the stack to the right has been referred for the purposes of better understanding. For that purpose, the sealing means of discharge (11) is put into practice with a mechanism of sliding grids such as that previously described in reference to FIGS. 6a and 6b, and the indicated position in FIG. 6a, sealing the bottoms (6) of the cavities (2). In this manner, the bottom separators/terminals (9) remain inside the molding cavities (2) retained in the manner of bottom or floor of the molding.

Besides, in the upper end (8) where the stuffed pieces (P) have been loaded, the hinged covers (12) that for practical purposes cover more than one cavity (2), are retracted against openings (8) covering the same, and exerting a compression force over the stack of stuffed products (P), with the thrust means (14).

In a preferred embodiment, cover (12) is adopted adding a hinge (15) and has multiple thrust elements (14), one for each cavity. Said thrust elements can be put into practice as plungers at the end of some sliding rods, in such a manner that they can be pushed to the inside of the cavities by means of springs (the springs operate with traction, pulling the plungers downwards in the figures; see DETAIL 4A).

Likewise, some other elastic or pushing means can be provided to push and trap the stack of stuffed products (P) inside the molding cavities (2), hydraulic, pneumatic means, etc.

Covers (12) are kept in closed position with a fast locking element (17) of the type commonly used for example in the toolkit box or similar, which operate by elastic tension or mechanical interference between the articulated components. This is a simple an effective solution, fast to operate and therefore it contributes to the apparatus productivity. It is worth noting that, as it is shown in FIG. 1, the covers (12) can be divided and/or grouped in assemblies, so as to cover a plurality of cavities (2), and can be retractable, connected in between themselves, hinged and clamped in different manners, without this being any kind of disadvantage to the purposes of this invention. Nevertheless, the fitting of the kind of cover herein described is highly advantageous since it provides a balance between the handling of the cover itself (12) and fastness of operation since it covers more than one molding cavity. The cover also has an appropriate support bevel (19) (see operation in FIG. 3) which permits to open said cover to one or other side of the apparatus, remaining in a support position against the bevel of the opposite cover.

Resuming FIG. 4, once the cover (12) are closed, and the product stuffed inside the molding cavities, a heating fluid is circulated in the outer part of said tubular molding cavities (2) for the necessary period of time until the desired cooking degree is achieved. In a preferred embodiment, a steam current is injected at an appropriate temperature to achieve the product cooking, in such a way that it circulates through the free space among the molding cavities (2), operating as a dipping chamber (16) inside which there are generally a group of tubular molding cavities (2), so that steam provides heat energy to the stuffed product (2) through the walls, preferably metallic, and cooks the product.

Cooking of stuffed product (P) is achieved when providing a heating circuit externally to the molding cavities, as detailed above or similar. As those skilled in the art may understand, product cooking can be achieved providing the necessary heating circuit, circulating steam, hot water, or other means which provide cooking.

Discharge Stage of the Product

FIG. 5 shows the moment when the stage of discharge or empty of molding cavities (2) is carried out, when the bottom end (6) of each tubular molding cavity (2) is unsealed, and permits the fall of such pieces of stuffed product (P) which were inside during cooking and are already cooled.

It is possible to operate the sealing element of discharge (11) manually or through an automatic command, so that the bottom of the molding cavities (2), that is to say, the first open end (6) that is now located in the lower position, is unsealed and lets the stacks of product (P) fall and the separator elements (9) preferably directed to a discharge tray (18).

In this manner, the pieces of stuffed product are received by said discharge tray (18) which is preferably leaning towards the front of the apparatus so that product can be collected or dropped into a transport carriage. Likewise, reception of pieces that fall from cavities (2) could be obtained directly over a movable wheeled carriage, a conveyor belt, a tray with double inclination and/or other equivalent shapes. Nevertheless, a receiving tray (18) is illustrated and shown as a preferred embodiment, since it has been demonstrated it is a comfortable, advantageous design which provides a smooth reception of the product. Additionally, in said FIG. 5 it is shown a variation of the apparatus which permits to hold momentarily the pieces (P) already molded and cooked with a holding gate (25) before its travel to another stage of process and/or packaging.

Procedure to Obtain Cooked and Molded Pieces

Since the apparatus which is scope of this invention is clearly intended to carry out an industrial procedure of cooking and molding of a food product, the same has been described in several stages of use, generally related with the stages of the procedure performed. As such, it is possible to outline the stages or steps that are part of the preferred procedure to be used with the apparatus of this invention, which, as it is evident for those skilled in this field of the technique who have the information herein described and illustrated, is susceptible of variations, that for the purpose of this invention can be just selection of design and/or equivalent or repetitive steps, as appropriate.

The preferred procedure to use efficiently the apparatus object of this invention implies the following steps:

a) To seal one of the ends, preferably the bottom end (6) of the tubular molding cavities (2);

b) to enter a plurality of pieces of stuffed product (P) not yet cooked inside said tubular molding chambers (2) inserting a separator means (9) between the pieces (P);

c) close the other end (8) of said tubular molding cavities (2), remaining said pieces of stuffed product (P) confined inside said tubular molding cavity (2), said sealing means of discharge (11) and said locking cover (12);

d) to circulate a heating fluid in the outside of said tubular molding cavities (2) until the desired cooking degree is obtained;

e) to circulate a cooling fluid in the outside of said tubular molding cavities for the period of time required until the desired cooling degree is achieved so that it can be correctly unmolded; in this manner, for example, when circulating cold water in the outside of the molding cavities, it is possible to reduce substantially the temperature of the molding pieces, therefore making the unmolding easier, the same heating circuit can permit the circulation of cooling fluid when appropriate.

(f) unseal the end located in the lower portion of said tubular molding cavity, which permits the fall of pieces of stuffed product that were confined during cooking and cooling;

Although those skilled in the field of technology well understand common terms and expressions in this type of industry like "desired cooking degree" and "desired cooling degree" related to the cooking of the products, to the purpose of this invention and in agreement with the interpretation commonly adopted in industry, the product to be cooked is heated to a temperature enough as to produce the cooking of the product for the required time until the desired cooking degree is achieved, being the desired cooking degree related to the combination of pre-established temperature and time by the manufacturer to ensure that the product meets the cooking specifications for a food product. Additionally, once the desired cooking degree is achieved, cooling of the product is performed, for example through said circulation of said cooling fluid (like waster) for the required period of time until the cooling degree is achieved, that is to say, the product temperature decreases until cooking is cur and it provides a state of turgidity and handling o the product in such a manner that it can be unmolded, herein referred to as correct unmolding: which implies that when the bottoms (6) of the molding cavities (2) are unsealed, the stacks of product (P) fall completely as shown in FIG. 5. TO this respect, considering that the stuffed product (P) and the separation pieces (9) fall by gravity, it is appropriate that the same be received adequately when falling, and therefore it is preferable to add the following step:

g) to collect the pieces of stuffed product (P) that fall from said bottom end of said molding cavities (2), in a collecting tray (18).

t is important to mention that, for description purposes, it has been mentioned in step a) of the procedure that the sealing of an end is performed, preferably the sealing of the lower end (6) by means of a discharge sealing mean (11); and then in the referred step c) the sealing of the other end of the tubular molding cavity comprises the sealing of the upper end by means of a locking cover (12). Nevertheless, and as a skilled in the art should understand, whenever stuffed product (P) so stacked remains confined inside the molding cavities (2), both ends can be mentioned interchangeably for loading purposes and for retention inside cavities (2).

As it has been illustrated and described in the specifications above developed, it is evident that the apparatus purpose of this invention provides the molding and cooking of a series of stuffed pieces of meat type and/or similar inside their coatings and preferably vacuum packaged, so as to provide a noticeable improvement in productivity, considering the apparatuses and methods available at present. This novel apparatus also provides the opportunity to put into practice a new industrial procedure which has shown to be highly innovative and convenient as to claim the right of exclusiveness below detailed.

Having described and determined the nature of this invention, and at least one manner in which the same can be put into practice, it is declared to be claimed as exclusive right and property the following:

1. A molding and cooking apparatus for hermetically packing stuffed pieces, the apparatus comprising:
    a hollow housing having a top end and a bottom end;
    a plurality of elongated molding cavities located inside the hollow housing, the plurality of molding cavities are vertically extending inside the hollow housing from the top end to the bottom end of the hollow housing, the plurality of molding cavities are vertically spaced from each other creating a vertical space, said hermetically packing stuffed pieces include a first closed end and a second closed end, each one of the ends including closing terminals, the hermetically packing stuffed pieces are designed to be vertically placed inside each one of the molding cavities;
    a discharge system connected to the bottom end of the hollow housing;
    a locking cover connected to the top end of the hollow housing;
    a discharge tray connected to the discharge system;
    a separator placed on the closed ends of the hermetically packing stuffed pieces, the separator separates the hermetically packing stuffed pieces inside the elongated molding cavities, each separator including a body with a hole, the closing terminals of each hermetically packing stuffed pieces are hidden inside the hole of the separator;
    a heat exchange system connected to the hollow housing;
    wherein the hermetically packing stuffed pieces are cooked inside the molding cavities by heating exchange of a fluid circulating outside said molding cavities and through the vertical space between said molding cavities.

2. The molding and cooking apparatus according to claim 1, wherein said molding cavities have a tubular shape.

3. The molding and cooking apparatus according to claim 1, wherein said locking cover includes a plurality of thrust devices, each thrust device includes a plunger, the plungers are connected to a sliding rod, each plunger is pushed inside a corresponding molding cavity to exert force over the hermetically packing stuffed pieces in a working position, the force is applied from the to end to the bottom end of the hollow housing.

4. The molding and cooking apparatus according to claim 1, wherein said separators have a shape that matches a shape of the molding cavities.

5. The molding and cooking apparatus according to claim 1, wherein said plungers are pushed to the inside of the molding cavities by using springs.

6. The molding and cooking apparatus according to claim 1, wherein said molding cavities have an external heating circuit.

7. A molding and cooking apparatus for hermetically packing stuffed pieces, the apparatus comprising:
    a hollow housing having a top end and a bottom end;
    a plurality of elongated molding cavities located inside the hollow housing, the plurality of molding cavities are vertically extending inside the hollow housing from the top end to the bottom end of the hollow housing, the plurality of molding cavities are vertically spaced from each other creating a vertical space, said hermetically packing stuffed pieces include a first closed end and a second closed end, each one of the ends including closing terminals, the hermetically packing stuffed pieces are designed to be vertically placed inside each one of the molding cavities;

a discharge system connected to the bottom end of the hollow housing;

a locking cover connected to the top end of the hollow housing;

a discharge tray connected to the discharge system;

a separator placed on the closed ends of the hermetically packing stuffed pieces, the separator separates the hermetically packing stuffed pieces inside the elongated molding cavities, each separator including a body with a hole, the closing terminals of each hermetically packing stuffed pieces are hidden inside the hole of the separator;

a heat exchange system connected to the hollow housing;

wherein the hermetically packing stuffed pieces are cooked inside the molding cavities by heating exchange of a fluid circulating outside said molding cavities through the vertical space between said molding cavities;

wherein said locking cover includes a plurality of thrust devices, each thrust device includes a plunger, the plungers are connected to a sliding rod, each plunger is pushed inside a corresponding molding cavity to exert force over the hermetically packing stuffed pieces in a working position, the force is applied from the top end to the bottom end of the hollow housing;

wherein the discharge system includes a first gridded section and a second gridded section sliding on the first gridded section, the first gridded section and the second gridded section are connected to a lever; and wherein in a non-working position the lever is activated to move the second gridded section along the first gridded section until both gridded sections are aligned to each other creating an opening that transports the separators and the hermetically packing stuffed pieces into the discharge tray.

* * * * *